Oct. 27, 1942.  I. HARTER  2,299,747
METHOD OF FORMING STRUCTURES WHOLLY OF FUSION DEPOSITED WELD METAL
Original Filed Aug. 10, 1938   3 Sheets—Sheet 1
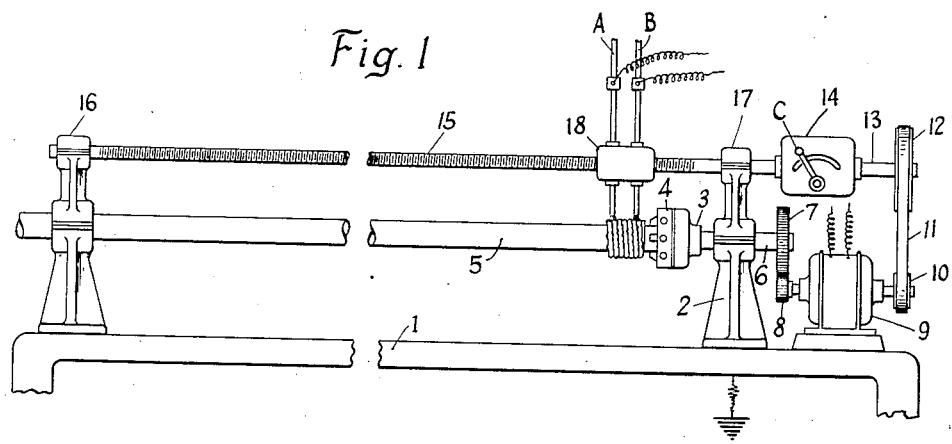
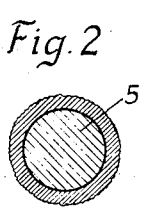
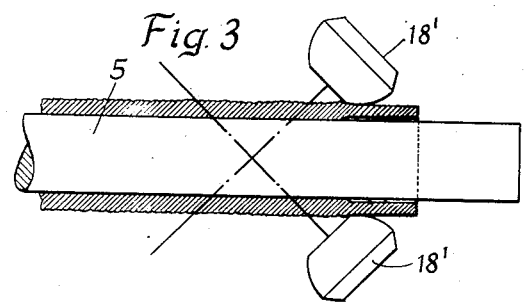
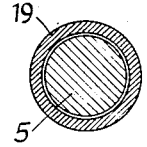
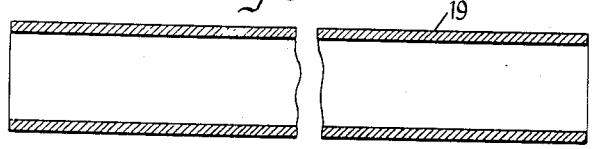
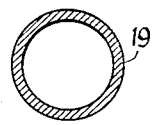
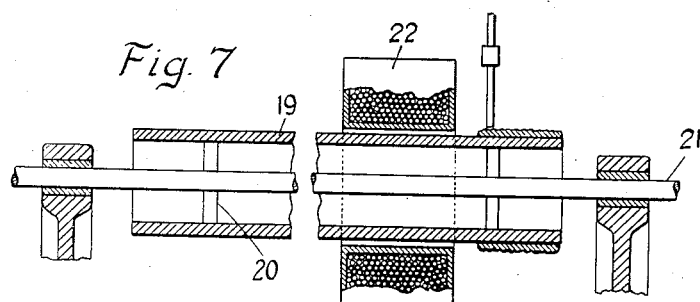
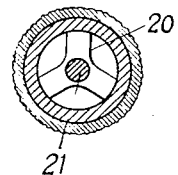
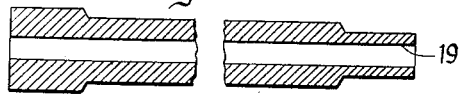
INVENTOR.
Isaac Harter
BY
W. Holbrook  Attorney Oct. 27, 1942.  I. HARTER  2,299,747
METHOD OF FORMING STRUCTURES WHOLLY OF FUSION DEPOSITED WELD METAL
Original Filed Aug. 10, 1938   3 Sheets-Sheet 2
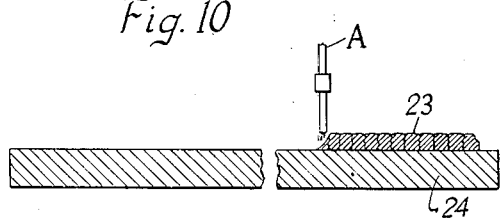
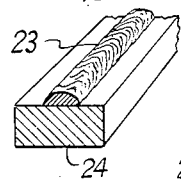
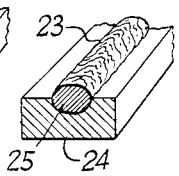
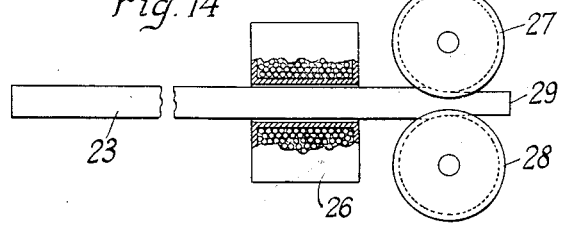
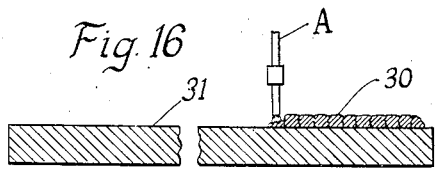
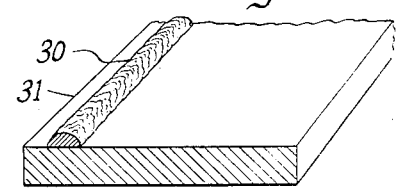
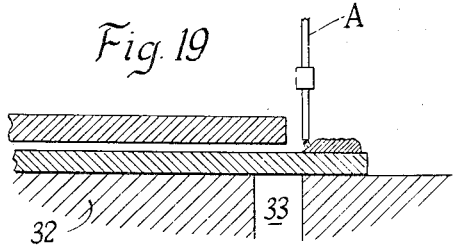
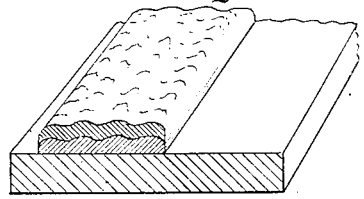
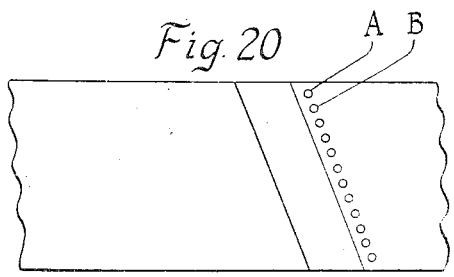
INVENTOR.
Isaac Harter
BY
Attorney Oct. 27, 1942.                I. HARTER                2,299,747
METHOD OF FORMING STRUCTURES WHOLLY OF FUSION DEPOSITED WELD METAL
                Original Filed Aug. 10, 1938    3 Sheets-Sheet 3

INVENTOR.
Isaac Harter
BY [signature] Holbrook
Attorney

Patented Oct. 27, 1942

2,299,747

UNITED STATES PATENT OFFICE 2,299,747

METHOD OF FORMING STRUCTURES WHOLLY OF FUSION DEPOSITED WELD METAL

Isaac Harter, New York, N. Y., assignor to The Babcock & Wilcox Company, Newark, N. J., a corporation of New Jersey Original application August 10, 1938, Serial No. 224,022. Divided and this application April 9, 1941, Serial No. 387,584

4 Claims. (Cl. 219—10)

This invention has reference to an article and the method of making the same wholly from metal deposited by a fusion process.

The present invention contemplates an article consisting of fusion deposited metal, produced in such manner as to provide a metal structure capable of resisting heavy stresses without failure, and having suitable characteristics for use as pressure vessels even under such large pressures as are encountered, for instance, in gun barrels, or for machine members requiring also different characteristics of surface metal compared with that of the main body, as for example a shaft or piston rod.

One manner of producing a metal article according to the present invention is to deposit metal by the arc process in successive intersecting fusion beads along a non-adherent base, the bead deposits also being superposed, if necessary, until the desired thickness dimension is attained, the base being removed at a predetermined stage of the operation. Successive layers may be made from electrodes of different metals or compositions, and even one layer may be of different metal in different parts of its area.

If the deposit is simultaneously made from several electrodes, different compositions may be selected for each for the purpose of forming an ultimate alloy by solution of the one into the other to attain certain physical characteristics in the metal of the finished article.

When a fusion layer is deposited upon a body of unfused metal, the surface of the latter is fused by the action of the deposited metal and, upon cooling, this fused surface stratum will shrink more than the underlying metal and stresses will be set up so severe as to result in cracks, or such as to make the resultant body less able to resist internally imposed stresses than would otherwise be the case. When the intended use of an article is such as to be impaired by this feature, the unfavorable condition may be prevented by heating the unfused metal body receiving the fusion layer to a sufficiently high temperature without fusing it. The deposit as it is formed may be heated to within the plastic range so that after deposit of even large thicknesses there will be no cracking after cooling, and the metal grain will be refined. The required heating of either the unfused metal body or the deposit may be accomplished by electric induction, or resistance heating means.

If coated or covered weldrods or electrodes are used, means must be provided for removing slag, if the coatings or coverings are slag forming, so that the metal deposits are always made upon clean metal. The fusion deposits may be formed under the protection of a fluxing material, or in the presence of an inert or non-oxidizing blanket of gas, or under normally solid blanketing substances of inert character.

It is also within the purview of the invention that the deposited metal be forged before any substantial cooling, and a completed rough article may be worked or forged to final condition either after separate forging of each layer or the forging may take place after the required thickness has been built up on successive strata. In this case a very fine grained and dense structure results, one that is capable of high stresses without failure.

The invention may involve the simultaneous use of a plurality of weldrods the metals of which contribute to an ultimate alloy product some particular characteristic, such as ductility, hardness, toughness, machineability or the like for all or a part of the thickness, or area deposited. When desired, a part of the final body may be of a different metal, as for instance an outside face exposed to erosion may be of erosion resisting metal, or of corrosion resisting metal.

For the purpose of illustrating the invention, the following drawings are referred to. In these drawings:

Fig. 1 is a side elevation, partly in section, of a set-up for a continuous deposit of metal upon a mandrel and from one or more weldrods;

Fig. 2 is an end elevation in section of the mandrel and deposit of Fig. 1;

Fig. 3 is a diagrammatic view illustrating the rolling of the strata fusion deposited on the mandrel shown in Fig. 1;

Fig. 4 is a transverse section of the mandrel and tube after rolling;

Fig. 5 is a longitudinal section of a completed tube;

Fig. 6 is a transverse section of the tube of Fig. 5;

Fig. 7 shows the tube mounted upon an expanding mandrel for further operations;

Fig. 8 is a transverse section of the tube and mandrel of Fig. 7;

Fig. 9 is a longitudinal section of a stepped build-up, such as may be accomplished by the apparatus and method of the present invention;

Figs. 10 and 11 are side and end elevations, respectively, of one manner of forming a bead deposit for a rod;

Fig. 12 is a perspective view indicating another manner of forming a rod;

Fig. 13 is an end view of the rod strip removed from the base;

Figure 21:
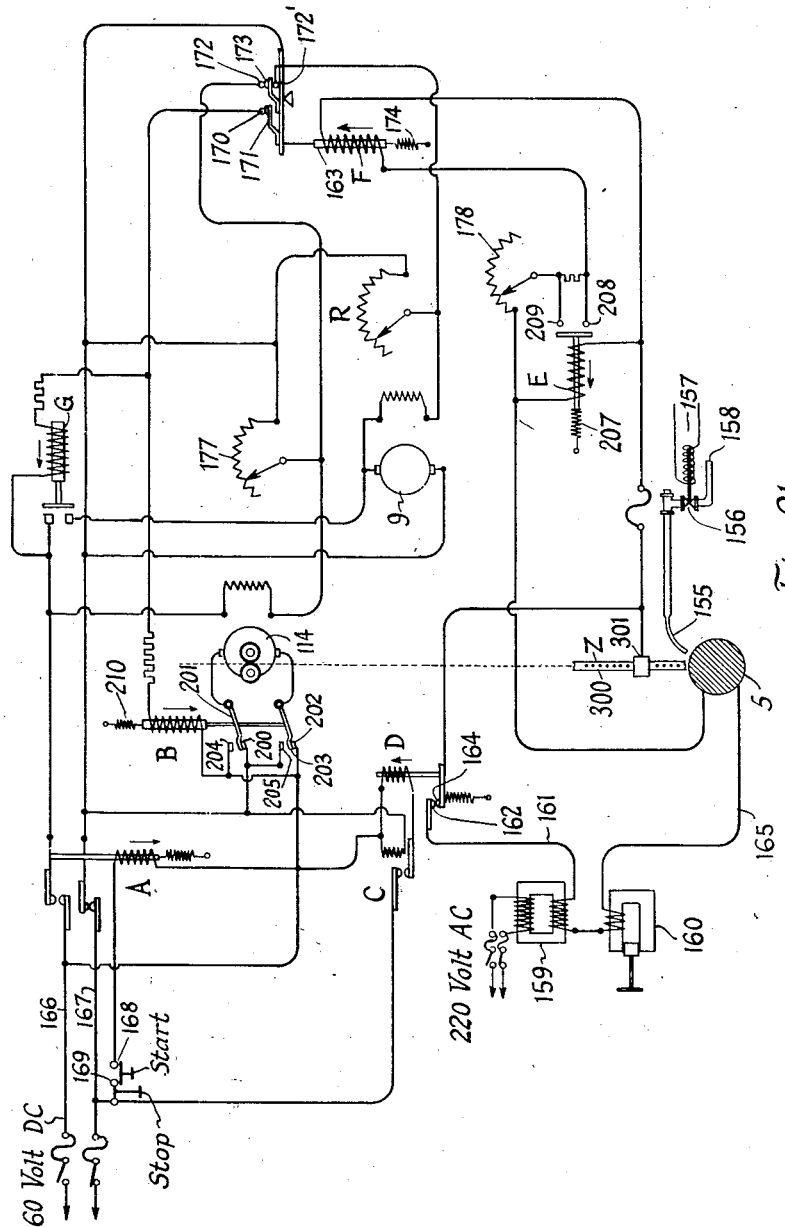

Fig. 14 indicates the manner of sizing and finishing the round rod;

Fig. 15 is an end elevation of the finished rod;

Figs. 16, 17, and 18 indicate steps in the forming of a flat plate;

Fig. 19 shows another step in a method of forming a flat plate;

Fig. 20 shows a top plan view of the apparatus shown in Fig. 19; and

Fig. 21 is a diagrammatic view of the welding circuit of an apparatus for carrying out the method of the present invention.

The apparatus indicated in Fig. 1 includes a bed plate 1 provided with a bearing stand 2 in which is journaled the shank 3 of a rotating chuck 4 supporting the mandrel 5. The chuck 4 is driven by means of a tail spindle 6 provided with gear 7 meshing with pinion 8 on one end of the shaft of a motor 9, the other end of which carries a belt pulley 10. A belt 11 over pulley 10 drives pulley 12 on the end of a shaft 13 operating a suitable variable speed drive 14. The latter transmits rotary motion to a lead screw 15 journaled in bearings 16 and 17 the axes of which are parallel to the axis of the chuck 4 and mandrel 5 carried thereby.

Traveling along the lead screw 15 are one or more arc welding heads 18 of a type which automatically advances the weldrod and controls the length of arc such, for instance, as is disclosed in the co-pending application of James E. Trainer, Ser. No. 730,852, filed June 16, 1934 (now Patent 2,135,129, granted November 1, 1938). The welding head may feed and regulate the arc of more than one weldrod, two, for instance being shown here at A and B.

With the apparatus indicated in Fig. 1 operating in accordance with the welding head and circuit disclosure of the aforesaid Trainer patent, the rate of deposit from weldrods A and B may be controlled and the arcs being stabilized. The circuit of this apparatus not only includes the weldrod feeding motor or motors, but also the driving motor 9, and thus the characteristics across the arcs control the rate of deposit, the speed of the mandrel 5 and the feed of the lead screw 15, which latter may, however, be independently varied by changing the position of the change speed controller C. The control circuit will be hereinafter described in greater detail.

With the apparatus as above described, and using a mandrel 5 of such a character the fusion deposited metal will not adhere, the weldrod metal from weldrods A and B is fused and deposited in intersecting or overlapping helical formations along the mandrel 5, the weldrods being moved longitudinally of the mandrel 5 at a selected rate while the mandrel 5 is rotated by the motor 9 at a selected and adjusted rate. There is thus produced upon the surface of mandrel 5 a tubular deposit of helical beads, each successive bead laterally fused to the adjacent one that has been previously deposited.

After a section of the mandrel has been covered by such metallically continuous layer of weld metal, the mandrel is removed and transferred to a rolling mechanism of the type used for rolling tubes over a piercing mandrel, such mechanism being indicated in Fig. 3 of the drawings. This mechanism includes rolls 18', which are four in number (only two being shown), pressure contacting the unformed tube with their axes angled as indicated. The rolling operation, performed while the tube and mandrel are hot, produces a smooth exterior while coincidentally expanding the metal of the tube so that the mandrel may be freely removed, thus leaving a finished tube 19 of weld metal of uniform thickness.

The tube 19 thus formed may be given additional thickness, if desired, by mounting it upon an expanding mandrel 20 as shown in Fig. 7, the spindle 21 of which may be carried in the chuck 4 of the apparatus shown in Fig. 1, weldrods A and B being employed to produce an additional fusion deposit while the tube is heated immediately in advance of the point of deposit by an electric inductive heater or the like 22. The heater is controlled so as to produce a forging temperature in the tube metal, immediately in advance of the arc and over a narrow circumferential zone which is to be immediately overlaid with a deposit of the fusion metal.

The external deposit is fused to the tube metal and, as the latter freezes, the softness of the heated metal permits shrinkage without excessive stress and with no tendency to crack. If desired this operation may be repeated until the resulting product is of considerable thickness; in fact, various thicknesses may be built up so that an article may be thicker at one end than at the other, as shown in Fig. 9, this being accomplished by varying the length over which successive deposits are laid.

Any of the successive layers may be of metal different than the others by changing the weldrods, and also any of the layers may be of an alloy of two or more metals determined by using weldrods of appropriately different metals to form the desired alloy.

If desirable there may be substituted for the mandrel 5 of Fig. 1 a tubular mandrel upon which the deposits are made, this mandrel being similar to that indicated in Fig. 7 and being heated inductively in the same manner as shown in Fig. 7 so that shrinkage is taken care of as the metal freezes. Alternatively, the tube may be slotted longitudinally or spirally, to take care of shrinkage, the fusion metal being deposited upon the tube to a desired thickness, after which, while the tube has become an integral part of the structure, it may be bored out so as to be completely eliminated and thus leave a structure which is wholly of fusion deposited metal.

It is likewise to be considered that it is within the scope of this invention to roll the tube as in Fig. 3 between the stages of depositing successive layers, and that if coated weldrods are used which are of a slag forming character all the slag left after the deposit of one layer shall be removed before the deposit of the next layer.

The invention contemplates also the making of a shaft in the manner indicated in Figs. 10 to 15, inclusive. In this case the weldrod A deposits a strip of fusion metal 23 on a non-adherent base 24 having a flat face, as shown in Fig. 11, or having a grooved face as shown in Fig. 12 at 25, and from which face the strip 23 built to the predetermined thickness is subsequently removed. The rough strip is then fed through a heater, indicated herein as of the electric induction type as at 26, which raises the temperature to forging value. The strip then passes to the co-acting rolls 27 and 28 for reducing the section and producing a rod of the desired cross section.

This rod of weld deposited metal is then mounted in the apparatus of Fig. 1 to receive successive layers of weld metal in the manner previously described. During the course of the formation of the shaft there may be re-rolling at intervals, each layer being fusion attached to the core while the latter is at a temperature, in the forging range.

When the final shape is to resist rubbing wear on its outer surface one or more of the final layers may be deposited from weldrod metals that have become hard. The final finishing operation of the shaft may be by final rolling followed by machining or grinding to the desired surface smoothness and the required dimensions.

Another illustrative method of making a plate of weld metal is diagrammatically illustrated in Figs. 16 to 20, inclusive, wherein there is indicated the fusion depositing of a strip 30 on a plate of non-adherent material 31 followed by the deposition of parallel strips fusion welded to those previously laid to form a wide strip, such as shown in Fig. 18. This may be accomplished by the simultaneous fusion of a number of weldrods arranged side by side. The strip thus formed is then removed from its original base. The strip is then placed upon a table 32 as shown in Fig. 19 and fed over a source of heat rising through a slot 33 to raise the strip to a forging temperature prior to the deposition of an additional layer of metal. The latter may be applied by successive weldrods A, B arranged across the face of the strip as shown in Fig. 20, with each successive weldrod offset as indicated so as to permit the deposits from the various weldrods to properly join. After the deposit of successive strata in this manner the resulting sheet or strip may be rolled between flat rolls, forged or otherwise manipulated to produce a plate of the desired size and thickness. It is, of course, understood that successive layers, as in the case of a tube, may be of different metals, or that the weldrods may be regulated so as to produce a desired alloy either throughout the plate, or a varying alloy through the thickness of the plate in order to give the final product the desired properties.

The welding machine described in connection with Fig. 1 is used with a welding head and circuit of the type of weldrod feed and control of the aforesaid Trainer patent, but modified in accordance with the diagram herein shown by the inclusion in the circuit of a control motor 9 for driving the mandrel 5. The motor 9 may have its speed reduced as the arc lengthens, and have its speed increased as the arc returns to normal, or the motor 9 may have a normal rate of speed divided into two steps.

The work is indicated, for instance, as mandrel 5, and the weldrod at Z, the contact faces 300 of the weldrod being engaged by the diagrammatically represented current carrying shoes 301. The weldrod Z is moved to or from the work 5 by a reversible motor 114.

A jet of inert gas or reducing gas may be fed in proximity to the arc through a nozzle 155 from a supply pipe 158, controlled by a valve 156 which may be manually operated or automatically operated by the solenoid 157.

The arc circuit includes a power supply, preferably alternating current at a suitable voltage, for example 220 volts, which is connected to the primary of a welding transformer 159 and adjustable reactor 160. One side of the secondary of the transformer and reactor is connected by a lead 161 to one pole 162 of a magnetically operated switch (D), the other pole 164 of which is connected to the current carrying shoes 301 engaging the weldrod Z. The other side of the transformer connects by a lead 165 to the work 5; thus when the switch (D) is closed an arc may be struck and held between the end of the weldrod and the work 5.

After the arc is started, it may be controlled by regulating the rate of feed of the weldrod through control of the speed of the reversible weldrod feed motor 114.

In order to effect control of the reversible weldrod feed motor 114, in the form of the invention illustrated, a direct current supply line at a suitable voltage, for example 60 volts, is provided. As shown, the direct current supply line includes leads 166 and 167; and, as will presently appear, there is obtained an automatic regulation of the arc through the medium of control apparatus energized by this direct current supply and control apparatus actuated by the changing characteristics of the arc.

With the circuit shown, the operator adjusts the weldrod 151 to the work 5 and closes the "start-stop" switch to establish connection between the contacts 168 and 169. Current then flows from the lead 167, through the contacts 168 and 169, to the solenoid which operates the switch (A), thence back to the other side 166 of the supply line. Switch (A) will then close to establish a flow of current therethrough from the side 167 of the supply line, through the solenoid which operates the switch (C), and thence back to the other side 166 of the supply line. When switch (C) closes current will flow from the lead 167 through the contacts of the switch (C), through the solenoid which operates the switch (D) and then back to the lead 166. When switch (D) closes, the current in the arc circuit from the transformer 159 will flow through the contacts 162 and 164 and permit initiation of an arc between the weldrod and the work.

Closing of switch (D) also permits current to flow through the solenoid which operates an arc control relay switch (F) having a core or plunger 163. The latter operates two sets of contacts 170, 171 and 172, 173, respectively. When the solenoid of switch (F) is energized core 163 thereof is moved upward to first establish connection between contacts 170, 171 and after this contact is made further movement of the core breaks the connection between contacts 172, 173.

The core of the switch (F) is urged downwardly by a suitable spring 174. The engagement of the contacts 170 and 171 of the arc control relay switch (F), causes current to flow from the conductor 167 through the solenoid for operating the switch (B) and back to the conductor 166, thereby operating the switch to cause the engagement of contacts 200, 201 and 202, 203 to permit current flow through motor 114 in a direction to feed the weldrod 151 toward the work, the field of the motor having previously been energized by the closing of the switch (A).

The solenoid for operating switch (E) is in a circuit arranged in parallel with that circuit which includes switch (F). The solenoid of switch (E), when energized, acts in a direction to open contacts 208 and 209 of switch (E) and a spring 207 acts against the force of the solenoid to close the switch. The solenoid is designed to overcome the force of the spring 207 when the voltage flowing therethrough exceeds a predetermined amount, for example 50 volts. A resistor 178 of predetermined characteristics, for example, 20 ohms is arranged in shunt relation with contacts 208 and 209 of switch (E), and both are in series with the circuit which includes the solenoid of switch (F), the purpose of such arrangement being to provide for the protection of the solenoid of switch (F) before the arc is struck or in case the voltage becomes excessively high due to a long arc or failure of the arc. With the striking of the arc, the voltage drops and spring 207 closes switch (E), thereby shunting the resistor 178.

With the foregoing arrangement, should the arc lengthen and cause an increase in voltage through the solenoid of the arc control relay switch (F), such solenoid will move the relay plunger 163 upward to a point where the engagement of contacts 172 and 173 is broken while contacts 170 and 171 remain in engagement, and as a result current flows through a shunt circuit including a manually adjustable rheostat 177 arranged in series with the field of the motor 114. This action causes this motor to increase its speed and thereby move the end of the weldrod nearer the work at an increased rate, thus shortening the arc length and reducing the voltage through the solenoid of switch (F). This causes the relay plunger 163 to be moved downwardly by spring 174 sufficient to re-establish the engagement of contacts 172 and 173 and to shunt out the rheostat 177, but insufficient to break the connection between contacts 170 and 171. The weldrod motor 114 will then operate at its former speed.

The speed at which the motor 114 operates when the connection between contacts 172 and 173 is broken, depends upon the previously selected adjustment of the rheostat 177. Also, the arc length control rheostat 178 in series with the solenoid of switch (F) is adjustable to absorb more or less of the arc voltage so as to alter the critical arc voltage at which solenoid of switch (F) breaks the connection between contacts 172 and 173. Therefore, the rheostat 178 functions to determine the arc length at which stable operation is maintained.

Should the weldrod freeze to the work 5, the resistance to flow drops to zero, thus short circuiting the solenoid of the arc control relay switch (F). As a result spring 174 disengages contacts 170, 171 and de-energizes the solenoid of switch (B). A spring 210 will then break the connection between contacts 200, 201 and 202, 203, and establish connection between contacts 201, 204, and 203, 205, thereby causing the current to flow through the armature of the motor 114 in the reverse direction, moving the weldrod away from the work to re-establish the arc. As the contacts 172, 173 are in engagement, the motor will operate in the reverse direction at the slow speed, thereby facilitating the reestablishing of the arc. When the arc is reestablished, current will then flow through the solenoid of switch (F) and cause contacts 170 and 171 to be re-engaged, energizing the solenoid of switch (B), and causing the latter to again close contacts 200, 201 and contacts 202, 203, and the current to flow through the motor 114 in a direction to move the weldrod toward the work.

In connection with this circuit it is to be noted that during the fusion deposition of the weldrod metal, the contacts 170, 171 of the arc control relay switch (F) are closed at all times except when the resistance to current flow set up by the gap approaches zero by, for instance, the short circuit condition above described. However, the right hand contacts 172, 173 of the switch (F) open and close according to slight adjustment of the relay plunger responding to variations in the voltage due to variations of arc length. It will thus be evident that the contacts 172, 173 of the arc control relay switch (F) place the weldrod field rheostat 177 in and out of the circuit of the field of the motor 114, and with this arrangement the weldrod feed motor is caused to operate at a predetermined high speed, or a predetermined slow rate depending upon the relationship of contacts 172, 173.

The predetermined high speed of the weldrod feeding motor 114 must be such that the weldrod or electrode is fed to the work at a rate faster than it is consumed by the arc. Otherwise the operation of the arc would be unstable. However, the predetermined slow rate is preferably slower than the rate of consumption of the weldrod by the arc, as otherwise the arc will continue to shorten, thereby causing the plunger of the arc control relay switch (F) to drop, opening the contacts 172, 173 and de-energizing the coil of switch (B) which would cause the weldrod feeding motor 114 to reverse.

The motor 9 as shown in Fig. 21 is connected for unidirectional rotation at selected speeds, according to the amount of resistance in series with the shunt field winding. For normal conditions of the arc, the motor rotates at maximum speed, while for abnormal conditions such as lengthening of the arc or short circuit with the work, the speed of the motor is reduced, or the motor stopped altogether, as will be hereinafter set forth.

An additional contact 172' is included in the relay switch (F) so that when the arc lengthens and the connection between contacts 172 and 173 is broken, a contact is immediately established between 173 and the lower contact 172' which short circuits the resistance (R) in the shunt field of motor 9; thus with an increased speed of the feed motor 114 to shorten the arc, the speed of motor 9 is reduced since during this period the weldrod metal is being deposited at a lower rate. When the arc is restored to normal length, and voltage across the relay (F) is lowered, the spring 174 acts to break the connection 173, 172' and reestablishes connection between 173 and the upper contact 172.

In order that the motor 9 shall operate only when the arc is normal, the relay (G) is provided to close and open the power supply to motor 9. When the arc is initiated and deposition of weld metal begins, relay (F) is energized and contacts 170 and 171 are connected, as already described. The relay (G) is in parallel with the switch (B) and thus closes the power circuit of motor 9 as long as contacts 170 and 171 are in contact and motor 114 is feeding the electrode toward the work.

When the arc voltage drops below the required minimum for normal operation due, for example, to the weldrod contacting the work, the contacts 170, 171 are opened and switch (G) is de-energized, thereby opening the power lead to motor 9 and stopping movement of the work, while the feed motor is reversed to reestablish the normal arcing distance.

It will be evident from the foregoing that the apparatus described is adapted to carry into effect the illustrative method, and while specific details are herein given it is nevertheless to be understood that in practicing the invention I may resort to any modifications falling within the scope of the appended claims.

This application is a division of my previous application 224,022, filed on August 10, 1938.

What is claimed is:

1. In a method particularly adapted for the manufacture of tubular products, utilizing a fusion welding process to deposit metal from a weldrod or wire upon a base to form a central element of the ultimate product, separating the deposited metal and the base, heating said central element in annular circumscribing zones progressing therealong, and immediately following up the progressive heating with similarly progressing electric fusion deposition upon said member of additional metal derived from a weldrod, said deposition taking place before the heated metal has cooled to any substantial degree and involving intersecting convolutions of weld metal deposited as a helix enclosing and integrally bonded to said element.

2. In a method particularly adapted for the manufacture of a tubular member, utilizing the electric fusion welding process to deposit metal from a weldrod or wire upon a cylindrical base to form a central element of the ultimate product, separating the deposited metal and the base, heating said central element in circumscribing zones progressing from one end thereof, and following up the progressive heating with similarly progressing electric fusion deposition upon said member of additional metal derived from a weldrod, said deposition taking place before the heated metal has cooled to any substantial degree, and involving intersecting convolutions of weld deposits made as a helix enclosing and integrally bonded to said member.

3. In a method particularly adapted for the manufacture of tubular members such as gun barrels of large calibre, utilizing the electric fusion welding process to deposit metal from a weldrod upon a base to form the central element of the gun barrel, separating the deposited metal and the base, removing the slag coating resulting from said process, heating the formed metal member in circumscribing zones progressing from one end thereof, and following up the progressive heating with similarly progressing electric fusion deposition upon said element of additional metal derived from a weldrod or wire, said deposition taking place before the heated metal has cooled below the plastic range and involving intersecting convolutions of weld deposits made as a helix enclosing and integrally bonded to said element.

4. In a method of forming a tubular member, utilizing an electric fusion welding process to form contiguous convolutions of intersecting weld deposits made as a helix enclosing a non-adherent base and forming an inner element of said member, said deposits being derived from a coated weldrod or wire which is automatically fed toward said base member, separating the base and any extra deposited material from the deposited metal, zone heating the deposited metal by electric induction heating effecting relative movement between the heating zone and the deposited metal, following up said zone heating with the similar electric fusion deposition upon said inner element of additional metal, and so coordinating said heating and the second deposition of metal that the latter takes place upon the first deposited metal while the latter is at a relatively high temperature.

ISAAC HARTER.